April 3, 1951     J. S. HIGH     2,547,006

PNEUMATIC SPRING DISK VIBRATOR

Filed July 1, 1946

INVENTOR.
JURJEN S. HIGH.
BY
*F. J. Schmitt*
ATTORNEY.

Patented Apr. 3, 1951

2,547,006

UNITED STATES PATENT OFFICE 2,547,006

PNEUMATIC SPRING DISK VIBRATOR

Jurjen S. High, Philadelphia, Pa.

Application July 1, 1946, Serial No. 680,778

5 Claims. (Cl. 121—48)

(Granted under the act of March 3, 1883, as amended April 30, 1928; 370 O. G. 757)

This invention relates to improvements in vibrators and more particularly pertains to improvements in vibrators of the type employed commonly for imparting vibration to mechanical equipment or other devices.

Objects of the invention are to provide an improved vibrator operable pneumatically, thereby eliminating the need for complex mechanical parts; to provide an improved vibrator in which vibrations are induced by an airstream working against spring discs; to provide an improved vibrator of the character referred to in which the amplitude and frequency of the vibrations can be regulated by control of the air pressure and of the tension applied to the spring discs; to provide an improved vibrator of simple and rugged construction particularly adapted for subjecting aircraft instruments or other devices to vibration tests; and to provide for carrying out the foregoing objects in a facile, economical and efficient manner.

Figure 1:
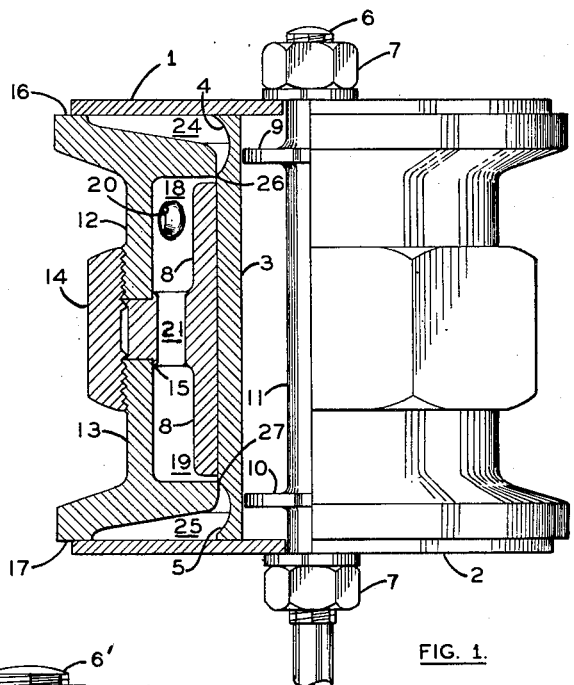
Figure 2:
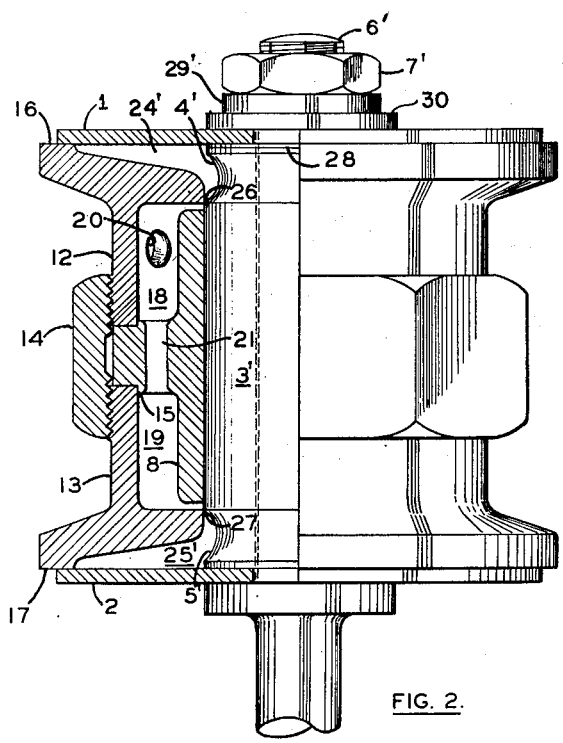

In accomplishing these and other objects of the present invention, improved details of structure are provided, a preferred form of which is shown in the accompanying drawing, wherein Fig. 1 is a side elevational view, partly in section, of a vibrator embodying the features of the present invention; and Fig. 2 is a view similar to Fig. 1, illustrating the vibrator supported on a modified form of mounting means.

Similar numerals refer to similar parts throughout the several views.

The improved vibrator of the present invention comprises a pair of centrally-apertured spring discs 1 and 2 retained in spaced parallel relation by a tubular inner sleeve 3, said sleeve preferably having circumferential air-passage grooves 4 and 5 adjacent the end portions of said sleeve.

As shown in Fig. 1, the sleeve is supported on a spindle 6 that passes through the apertures in the discs, and the discs are retained against the ends of said sleeve by nuts 7 engaged threadedly with said spindle and washers 29. It is apparent that the tension in the discs can be varied by adjustment of the position of said nuts. The form of spindle shown in Fig. 1 includes a body portion 11 of relatively small diameter and a pair of guide flanges 9 and 10 perferably formed integrally with said body portion and fitting snugly in the bore of the sleeve 3.

An outer sleeve 8 surrounds the central longitudinal portion of the inner sleeve 3 and has a central circumferential flange 15. Said flange has a plurality of longitudinal passages 21. Bearing members 12 and 13 are secured against the flange 15 to form a substantially airtight fit therewith and are retained by a nut 14. The bearing members have external seat portions 16 and 17 against which the spring discs 1 and 2 are adapted to seat. Said bearing members also have inwardly projecting flanges or seat portions 26 and 27 which terminate adjacent the inner sleeve member 3, forming a substantially airtight sliding fit therewith, except in the regions of the grooves 4 and 5.

It is thus seen that the space between the bearing members 12 and 13 and the inner sleeve member 3 is divided into four chambers, namely inner chambers 18 and 19 and outer chambers 24 and 25.

An inlet orifice 20 through one of the bearing members provides access for admitting air to the chamber 18.

Operation is initiated by disturbing the state of balance or equilibrium between the opposed pairs of chambers of the device. For example, a sharp blow downwardly on spindle 6 permits communication of air under pressure from chamber 18 to chamber 24, while a substantially airtight fit is maintained between chamber 19 and chamber 25. Alternatively, since orifice 20 is positioned proximate the end of chamber 18 distal chamber 19, the equalization of pressure in chambers 18 and 19 is not instantaneous, the dimensioning of passages 21 and the number of such passages determining the time lag. As a result, air under pressure will first "blow off" from chamber 18 to chamber 24, while a substantially airtight fit is maintained between chamber 19 and chamber 25. As another alternative, the securing of a weight to be tested to the lower end of spindle 6, combined with the effective weight of spindle 6, nuts 7, washers 29 and sleeve 3, exerts sufficient force downwardly on discs 1 and 2 to slide the sub-assembly of spindle 6 and sleeve 3 relative sleeve 8 a distance sufficient to permit communication of air under pressure from chamber 18 to chamber 24, while a substantially airtight fit is maintained between chamber 19 and chamber 25.

As still another alternative, the means hereinabove described can be employed additively.

In operation, air is admitted to the chamber 18 through the orifice 20. Such air flows into both inner chambers 18 and 19 and into one of the outer chambers 24 or 25 through one of the grooves 4 or 5. Assuming the air first flows into the upper outer chamber 24 through the groove 4, under the influence of one or more of the initiating forces hereinabove described, the pressure in said chamber builds until it is sufficient to unseat the disc 1 from the seat portion 16.

The unseating of the disc 1 allows escape of air from the chamber 24 and simultaneously draws the spindle 6 and inner sleeve 3 upwardly relative to the outer sleeve 8 and the bearing members. This latter action closes the chamber 24 from access to the chamber 18, since a substantially airtight fit is provided between the flange 26 and the sleeve 3 except in the region of the groove 4, which is now out of vertical alignment with said flange. However, the groove 5 is now carried into vertical alignment with the flange 27 and air enters the lower outer chamber 25. Pressure builds up within the chamber 25 until the disc 2 is unseated and the reverse of the movements just described occurs.

The alternate movement of the inner sleeve with respect to the outer sleeve produces a regular vibration. The amplitude and frequency of such vibration are controlled by regulating the air pressure and the tension in the spring discs. The lower end of the spindle 6 can be connected to any element to which it is desired to impart a vibration.

In the modified form of mounting means illustrated in Fig. 2, the spindle 6' is of increased diameter throughout and the flanges 9 and 10 eliminated. Spindle 6' carries inner sleeve member 3', said sleeve member having circumferential air-passage grooves 4' and 5' adjacent the end portions. The discs 1 and 2 are retained against the ends of said sleeve by nuts 7' engaged threadedly with said spindle and washers 28, 29' and 30. Elements 1, 2, 8, 12 to 23, 26, 27 are the same as the correspondingly numbered elements shown in Fig. 1, so that outer chambers 24' and 25' are provided. A snug fit is provided between the spindle and the inner sleeve throughout the length of the latter. Such design of spindle provides greater strength when such is required.

While only certain embodiments of the present invention are shown, it is apparent that the structure can be modified without departing from the spirit of the invention. Therefore, the invention is not limited by the disclosure set forth, but only by the scope of the claims.

The invention described herein may be manufactured and used by or for the Government of the United States of America for governmental purposes without the payment of any royalties thereon or therefor.

I claim:

1. In a vibrator, a supporting spindle, an inner sleeve mounted on said spindle and having circumferential grooves adjacent opposite ends, spring discs secured to said spindle at opposite ends of said inner sleeve, an outer sleeve slidably fitted over said inner sleeve, a pair of annular bearing members, means fixing said bearing members to said outer sleeve, said bearing members having external seat portions engageable with said discs and internal seat portions slidably engaging said inner sleeve in the region of said grooves, and an inlet orifice in one of said bearing members, pressure within the bearing members being adapted to unseat said discs alternately to produce vibration.

2. In a vibrator, supporting means, an inner sleeve mounted on said supporting means and having air passages adjacent opposite ends, spring discs secured to said supporting means at opposite ends of said inner sleeve, a pair of bearing members, means slidably supporting said bearing members on said inner sleeve, said bearing members having external seat portions engageable with said discs and internal seat portions slidably engaging said inner sleeve in the region of said air passages, and an inlet orifice in one of said bearing members, pressure within the bearing members being adapted to unseat said discs alternately to produce vibration.

3. In a vibrator, supporting means, a sleeve mounted on said supporting means and having air passages, spring discs secured to said supporting means at opposite ends of said sleeve, means providing a pair of external valve seats engageable with said discs and a pair of internal valve seats slidably engaging said sleeve in the region of said passages, means slidably mounting said seat providing means on said sleeve, and an inlet orifice in said seat providing means, pressure within the vibrator being adapted to unseat said discs alternately to produce vibration.

4. In a vibrator, supporting means, a pair of spring discs, means mounting said discs on said supporting means, means providing a pair of external valve seats engageable with said discs and a pair of internal valve seats, means cooperable with said internal seats to alternately permit flow to either of said discs, and an inlet orifice, pressure within the vibrator being adapted to unseat said discs alternately to produce vibration.

5. A vibrator comprising a supporting spindle, an inner sleeve carried on said spindle, said sleeve having circumferential grooves adjacent opposite ends thereof, a pair of spring discs secured to said spindle at opposite ends of said sleeve, an outer sleeve mounted slidably on said inner sleeve, said outer sleeve extending a lesser distance along said inner sleeve than the distance between said grooves, a bearing element mounted fixedly on a medial annular flange integral said outer sleeve, said bearing element and said outer sleeve defining chambers above and below said flange and having external seat portions engageable with said discs, internal seat portions engaging said inner sleeve slidably, and, with said grooves and discs, defining outer chambers, a plurality of passageways in said flange communicating between said inner chambers, and means to supply fluid under pressure to bring one of said inner chambers into communication with one of said outer chambers and the other of said inner chambers into communication with the other of said outer chambers alternately to produce vibration.

JURJEN S. HIGH.

REFERENCES CITED

The following references are of record in the file of this patent:

UNITED STATES PATENTS

| Number | Name | Date |
| --- | --- | --- |
| 1,865,745 | Crangle | July 5, 1932 |
| 2,319,608 | Kraut | May 18, 1943 |
| 2,370,068 | Palm | Feb. 20, 1945 |